United States Patent [19]
Lee et al.

[11] Patent Number: 5,816,058
[45] Date of Patent: Oct. 6, 1998

[54] DEVICE FOR MAGNETICALLY TREATING WATER

[75] Inventors: Chang Woo Lee, Changwon; Gui Nan Hwang, Kimhae; Jong Uk Lee; Young Kwen Kim, both of Changwon, all of Rep. of Korea

[73] Assignee: LG Electronics Inc., Rep. of Korea

[21] Appl. No.: 556,580

[22] Filed: Nov. 13, 1995

[30] Foreign Application Priority Data

Nov. 17, 1994 [KR] Rep. of Korea ........................ 94-30282
Jan. 5, 1995 [KR] Rep. of Korea ............................ 95-48

[51] Int. Cl.$^6$ .............................. F25B 49/00; B01F 13/08
[52] U.S. Cl. .............................. 62/126; 62/377; 366/273; 210/222
[58] Field of Search ..................................... 366/273, 282, 366/251; 210/222, 223; 62/126, 377, 3.1

[56] References Cited

U.S. PATENT DOCUMENTS 2,761,288  9/1956  Anderson et al. ..................... 62/338 X
2,894,377  7/1959  Shikles ....................................... 62/306

FOREIGN PATENT DOCUMENTS 0290609  5/1988  European Pat. Off. .
2623104  5/1989  France .................................... 366/273

OTHER PUBLICATIONS

Van Nostrand's Scientific Encyclopedia 8th Ed, Feb. 2, 1995 Douglas M. Considine p. 3280.
Encyclopedia of Chemical Technology, vol. 24 pp. 277, 276 John Wiley & Sons Inc.

*Primary Examiner*—William E. Wayner
*Attorney, Agent, or Firm*—Ladas & Parry

[57] ABSTRACT

A device for magnetically treating water equipped in a refrigerator, capable of achieving an easy production of magnetically treated water and an easy discharge of the magnetically treated water produced. A device for magnetically treating water mainly includes a permanent magnet for applying a magnetic force to water and a drive motor for rotating the water. A device for magnetically treating water is installed in the interior of the refrigerator so that the produced magnetically treated water is easily taken, thereby enabling a user to easily drink the magnetically treated water.

22 Claims, 14 Drawing Sheets

FIG.6
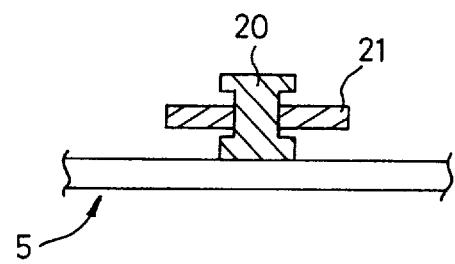
FIG.7A  FIG.7B
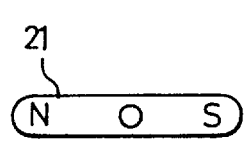 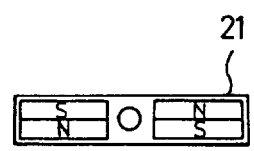
FIG.8A  FIG.8B
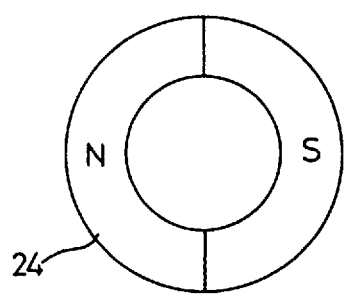 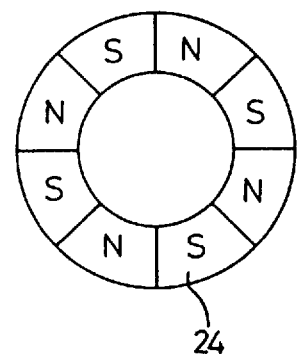

F I G. 16
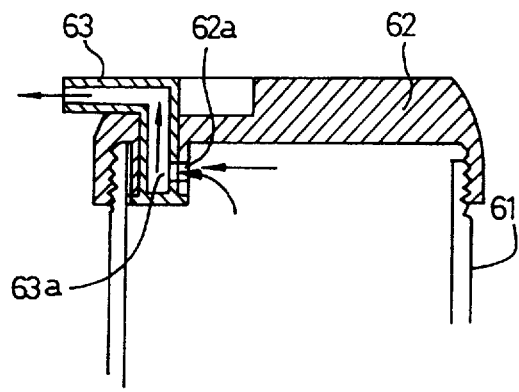
F I G. 17
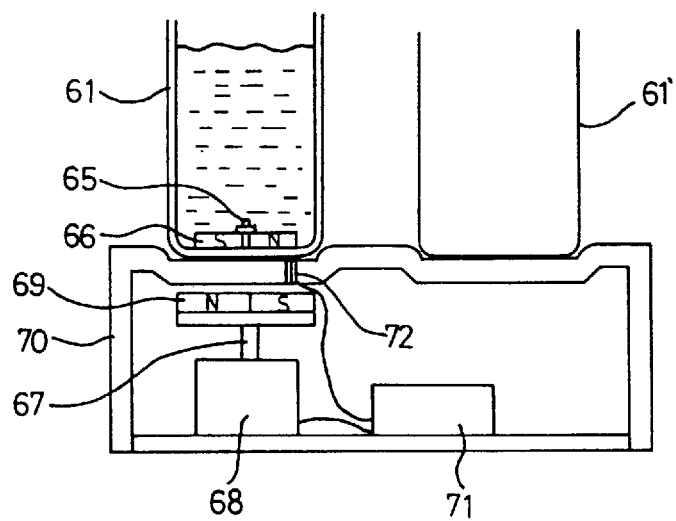
F I G. 18
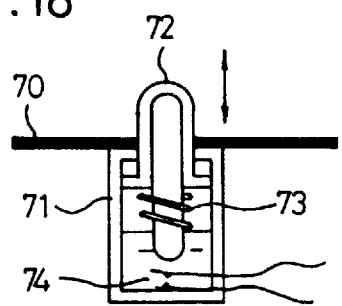

DEVICE FOR MAGNETICALLY TREATING WATER

BACKGROUND OF THE INVENTION

1. Field of the Invention

The present invention relates to a refrigerator employing device for magnetically treating water, and more particularly to device for magnetically treating water for a refrigerator, capable of achieving easy production of magnetically treated water and easy discharge of the magnetically treated water produced.

2. Description of the Related Art

It is believed that the properties of water influenced by a magnetic field are beneficial with regard to potential treatment for certain human ailments and diseases, promotion of plant and animal growth, and water promoting separation and precipitation operations on compounds with other substances.

SUMMARY OF THE INVENTION

Therefore, an object of the invention is to provide a device for magnetically treating water for a refrigerator, capable of achieving easy production of drinkable magnetically treated water effective for preventing diseases of adult people such as cancer, constipation, diabetes, gastroenteritis, etc.

Another object of the invention is to provide a device for magnetically treating water for a refrigerator, capable of easily discharging magnetically treated water and thereby providing convenience to a user.

In accordance with one aspect, the present invention provides a device for magnetically treating water for a refrigerator, comprising: a water container disposed in the interior of the refrigerator; magnetizing means arranged around the water container and adapted to apply a magnetic force to water contained in the water container and thereby changing the water into the form of magnetically treated water; and rotating means adapted to rotate the water in the water container and thereby promote the change of the water into magnetically treated water.

In accordance with another aspect, the present invention provides a device for magnetically treating water for a refrigerator, comprising: at least one main water container disposed in the interior of the refrigerator; magnetizing means arranged around the main water container and in the interior of the main water container, the magnetizing means being adapted to apply a magnetic force to water contained in the main water container and thereby change the water into the form of magnetically treated water; rotating means adapted to rotate the water in the main water container and thereby promote the change of the water into magnetically treated water; an assistant water container adapted to receive the magnetically treated water from the main water container and store it therein; valve means disposed between the main and assistant water containers and adapted to transfer the magnetically treated water from the main water container to the assistant water container; and discharge means provided at the assistant water container and adapted to discharge the stored magnetically treated water out of the assistant water container.

In accordance with another aspect, the present invention provides a device for magnetically treating water for a refrigerator, comprising: at least one water container adapted to store water therein; magnetizing means arranged around the water container and adapted to apply a magnetic force to water contained in the water container and thereby change the water into the form of magnetically treated water; rotating means adapted to rotate the water in the water container and thereby promote the change of the water into magnetically treated water; and control means adapted to sense a quantity of the water in the water container and control the rotating means on the basis of the sensed water quantity.

In accordance with another aspect, the present invention provides a device for magnetically treating water for a refrigerator, comprising: a magnetically treated water producing unit mounted to an inner surface of a door of the refrigerator; and discharge means adapted to discharge magnetically treated water produced by the hexagonal water producing unit on the outside of the door.

BRIEF DESCRIPTION OF THE DRAWINGS

Other objects and aspects of the invention will become apparent from the following description of embodiments with reference to the accompanying drawings in which:

FIG. 6 is a partial sectional view illustrating a rotating magnet disposed at the bottom portion of the main water container shown in FIGS. 2 and 3;

FIGS. 7A and 7B are plan views respectively illustrating the shape of the rotating magnet shown in FIG. 6;

FIGS. 8A and 8B are plan views respectively illustrating the shape of a driving permanent magnet shown in FIGS. 2 and 3;

FIGS. 10 to 13 are views respectively illustrating various constructions of a water cup shown in FIG. 2, which construction can be applied to all embodiments of the present invention, wherein FIG. 10 is a sectional view illustrating a water cup being one of the accessories of the device for magnetically treating water in accordance with the present invention, FIG. 11 is a schematic view illustrating a water cup equipped with a device for magnetically treating water, FIG. 12 is an enlarged view of a lid shown in FIG. 11, and FIG. 13 is an enlarged view of a rotating magnet driving unit shown in FIG. 11;

FIG. 16 is a sectional view illustrating the construction of a magnetically treated water outlet port of the water container shown in FIG. 15;

FIG. 17 is an enlarged view of a rotating magnet driving unit shown in FIG. 14;

FIG. 18 is a sectional view illustrating the construction of a weight sensor shown in FIG. 17;

DETAILED DESCRIPTION OF THE PREFERRED EMBODIMENTS

Figure 1:
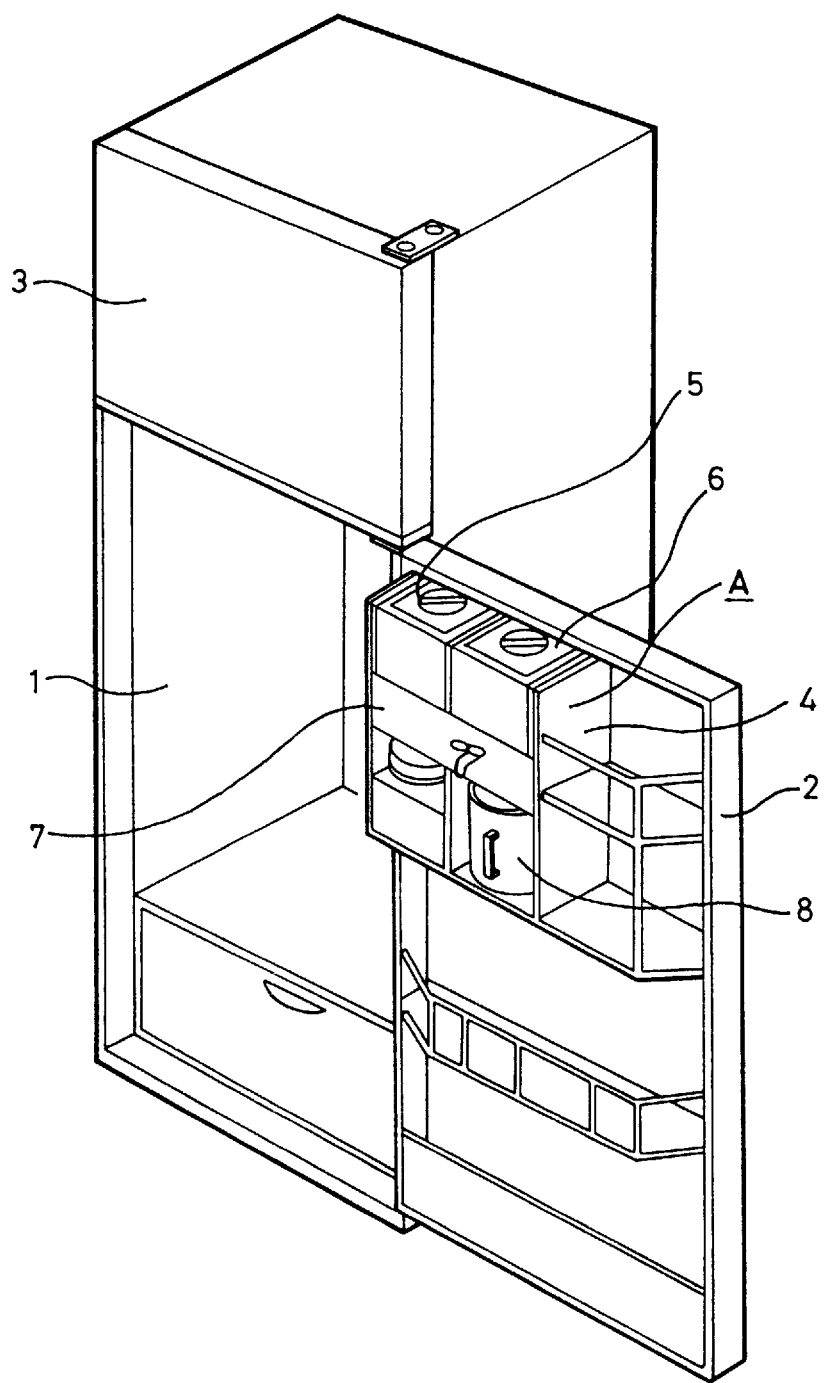
FIG. 1 is a perspective view of a refrigerator equipped with a device for magnetically treating water in accordance with an embodiment of the present invention.
Figure 2:
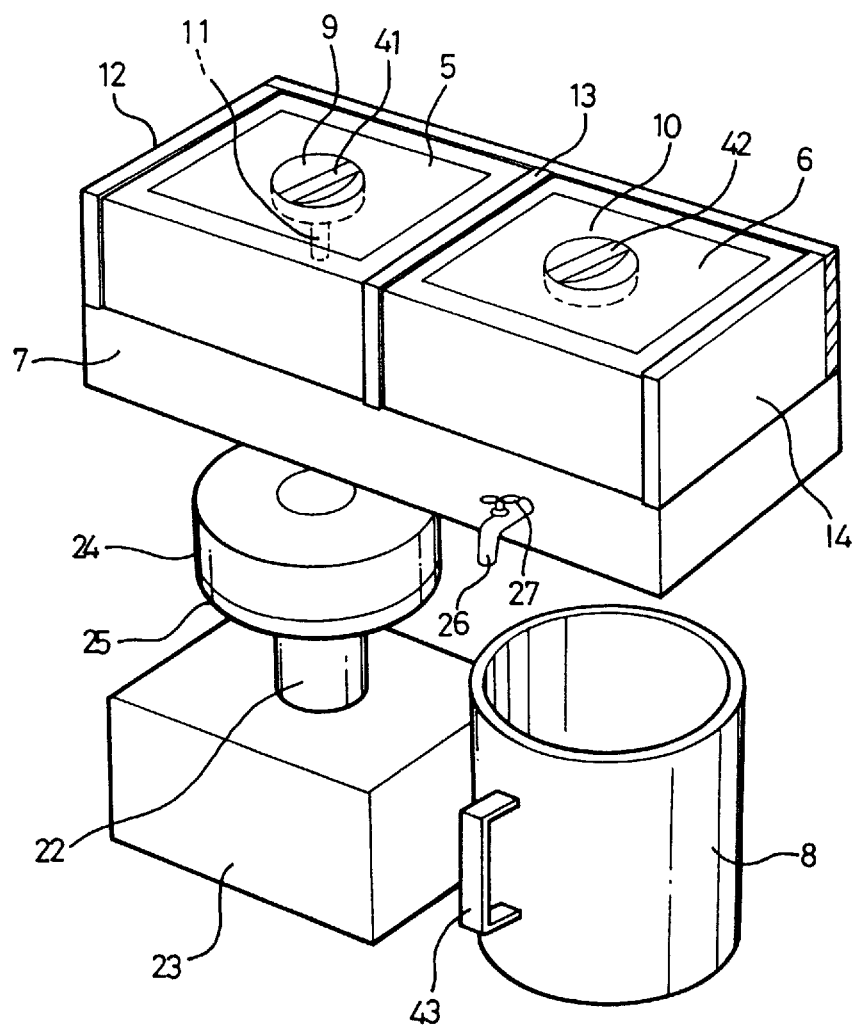
FIG. 2 is an enlarged perspective view of the device for magnetically treating water shown in FIG. 1.
Figure 3:
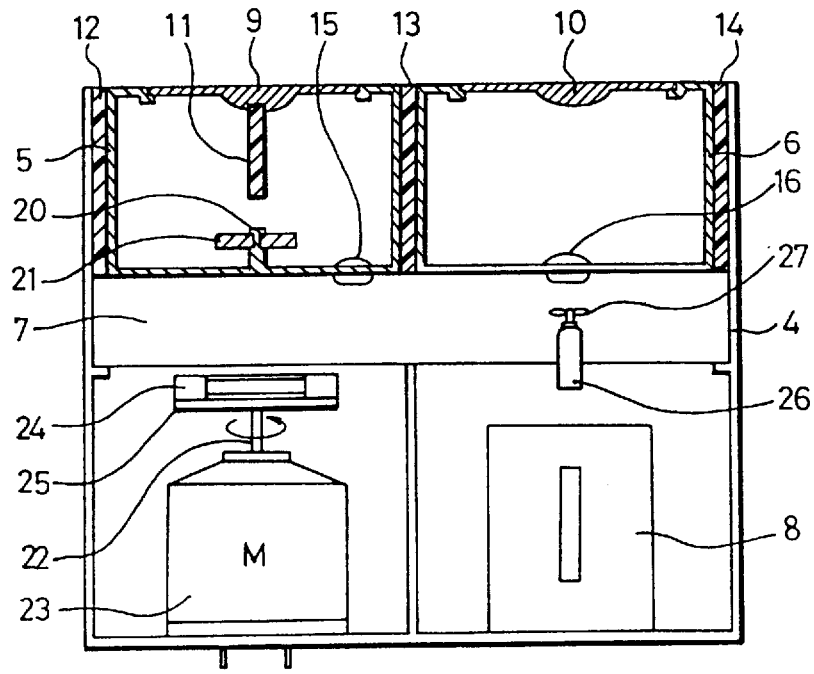
FIG. 3 is a sectional view of the device for magnetically treating water shown in FIG. 2.
Figure 4A:
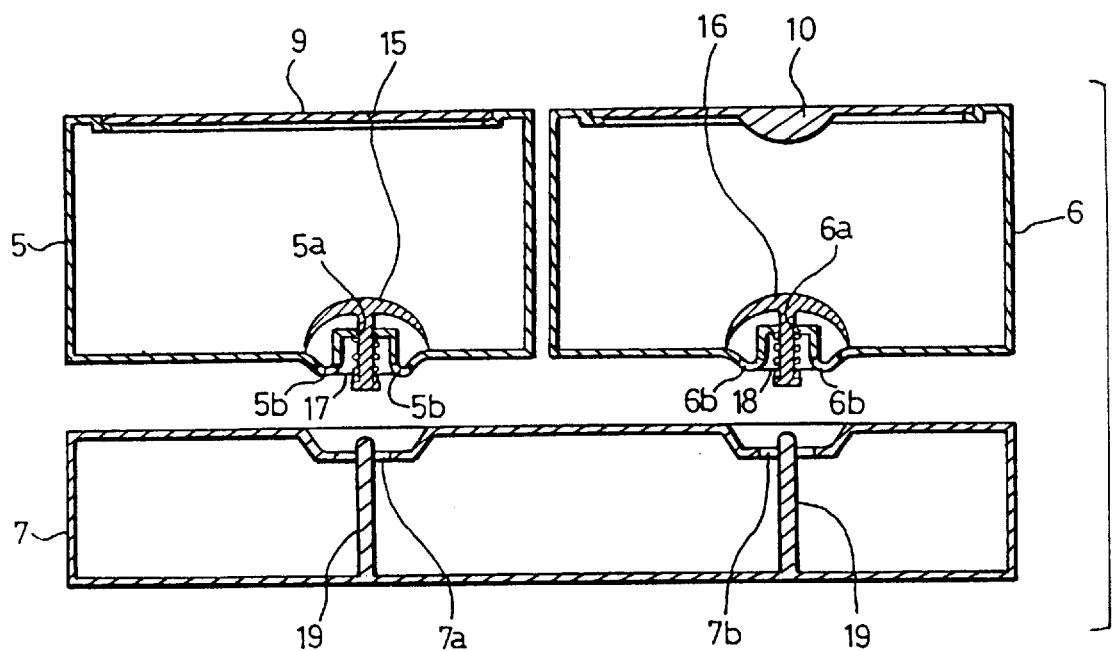
FIGS. 4A and 4B are enlarged sectional views respectively showing parts of the device denoted by the reference numerals 15 and 16 in FIG. 3 in order to illustrate a coupling construction between main and assistant water containers.
Figure 4B:
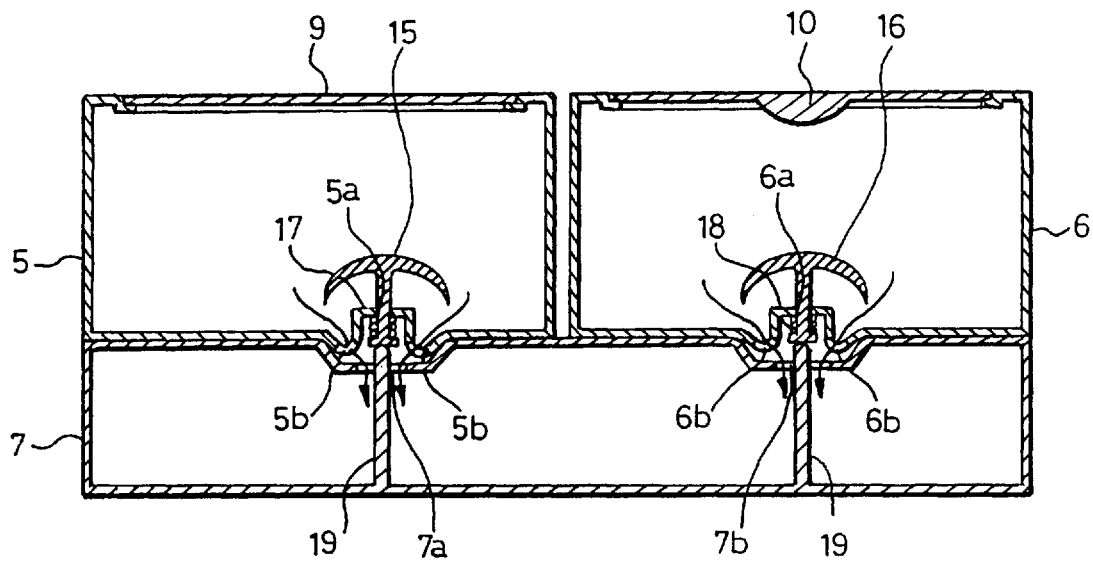

FIG. 1 is a perspective view of a refrigerator equipped with a device for magnetically treating water in accordance with an embodiment of the present invention. FIG. 2 is a perspective view of the device for magnetically treating water shown in FIG. 1. FIG. 3 is a sectional view showing the inner construction of the device for magnetically treating water shown in FIG. 2. On the other hand, FIGS. 4A and 4B are enlarged views respectively showing parts of the device denoted by the reference numerals 15 and 16 in FIG. 3.

In accordance with the present invention, the device for magnetically treating water denoted by the reference character A in FIG. 1 is installed on a door 2 for a refrigerating chamber 1 of the refrigerator.

However, the installation position of the device for magnetically treating water is not limited to the door 2 of the refrigerating chamber 1 as in the illustrated case. The device for magnetically treating water may be installed at other appropriate places such as the interior of the refrigerating chamber 1 or the interior of a freezing chamber 3. In the case of installing the device for magnetically treating water A in the freezing chamber 3, an additional stirring device is required to stir water contained in the device for magnetically treating water and thereby prevent the water from being frozen.

Now, the device for magnetically treating water equipped in the refrigerator in accordance with the embodiment of the present invention will be described in conjunction with FIGS. 1 to 8.

As shown in FIG. 1, the device for magnetically treating water A includes a support member 4 having an appropriate shape. The support member 4 is mounted on an upper portion of the inner surface of the refrigerating chamber door 2. To the upper portion of the support member 4, at least one main water container is coupled. In the illustrated case, two main water containers 5 and 6 are coupled to the support member 4. An assistant water container 7 is mounted to the middle portion of the support member 4. The assistant water container 7 is adapted to store water supplied from the main water containers 5 and 6 therein. A water cup 8 is laid on one side part of the lower portion of the support member 4.

Lids 9 and 10 are separably coupled to the main water containers 5 and 6, respectively, as shown in FIG. 2. At least one of the lids 9 and 10 is attached at its lower surface with a bar-shaped permanent magnet 11 (FIG. 3).

Although only the lid 9 of the main water container 5 is provided with the permanent magnet 11 in the case of FIG. 3, both the lids 9 and 10 may have permanent magnets 11, respectively.

Figure 5:
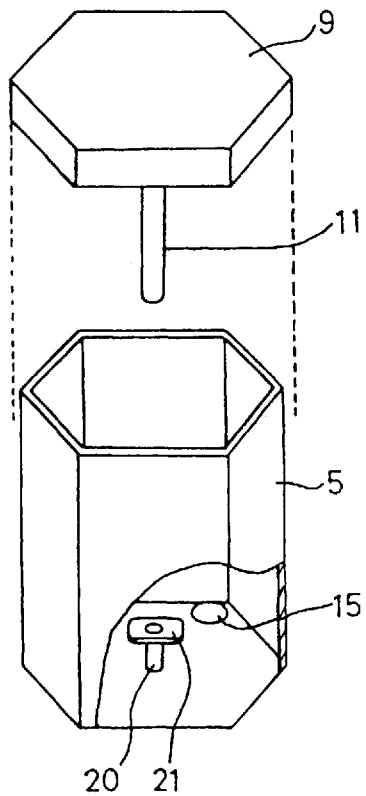
FIG. 5 is a perspective view of a modified construction of the main water container shown in FIGS. 2 and 3.

FIG. 5 shows a modified construction of the main water container 5. This construction is similar to that of the main water container shown in FIG. 4A.

Several plate-shaped permanent magnets 12, 13 and 14 are provided at outer side surfaces of the main water containers 5 and 6, respectively, so as to apply a magnetic force to the main water containers 5 and 6 at the side surfaces of the main water containers 5 and 6 (FIG. 3). The installation positions and number of permanent magnets are not limited to the illustrated case. Any other position and number of permanent magnets may be possible in so far as the water contained in the main water containers 5 and 6 is more effectively changed into the magnetically treated.

FIGS. 4A and 4B illustrate a valve unit for enabling the water contained in the main water containers 5 and 6 to be selectively supplied to the assistant water container 7, respectively. As shown in FIGS. 4A and 4B, the valve unit includes a pair of cock valves 15 and 16 provided at respective bottom portions of the main water containers 5 and 6. The cock valves 15 and 16 have valve stems extending through valve stem holes 5a and 6a formed at the bottom portions of main water containers 5 and 6, respectively. As the valve stems moves vertically through the valve stem holes 5a and 6a, the cock valves 15 and 16 open and close water outlet ports 5b and 6b formed at respective bottom portions of main water containers 5 and 6, respectively. The valve unit also includes a pair of springs 17 and 18 arranged around respective valve stems of the cock valves 15 and 16 and adapted to always urge the cock valves 15 and 16 downwards, a pair of water inlet ports 7a and 7b formed at the top portion of the assistant water container 7 and communicated respectively with the water outlet ports 5b and 6b of main water containers 5 and 6, and a pair of push rods 19 upwards protruded from the bottom portion of the assistant water container 7 and adapted to push respective valve stems of the cock valves 15 and 16 at a state that the main water containers 5 and 6 are coupled to the assistant water container 7.

A rotating unit to apply a rotating force to the water contained in the main water containers 5 and 6 is illustrated in FIGS. 2, 3 and 6. The rotating unit includes a central shaft 20 fixedly mounted on the bottom portion of the main water container 5, a rotating magnet 21 mounted on the central shaft 20 such that it can rotate about the central shaft 20, a drive motor 23 disposed beneath the main water container 5 and provided with a rotating shaft 22, and a driving permanent magnet 24 fixedly mounted on the rotating shaft 22 and adapted to rotate the rotating magnet 21.

As shown in FIGS. 7A and 7B, the rotating magnet 21 may be a magnet of various types such as a monopole type, bipole type, etc. In similar, the driving permanent magnet 24 may be a magnet of various types such as a monopole type, bipole type or multipole type, as shown in FIGS. 8A and 8B.

The rotating shaft 22 is provided with a shield plate 25 for preventing the driving permanent magnet 24 from exerting its magnetic force on the drive motor 23. The shield plate 25 is made of a non-magnetic material such as aluminum.

For discharging the magnetically treated produced, a discharge tube 26 and a discharge valve 27 are installed at one side portion of the assistant water container 7 (FIGS. 2 and 3).

FIGS. 10 to 13 are views respectively showing a construction of the water cup 8 shown in FIG. 2 in accordance with a preferred embodiment of the present invention.

Figure 10:
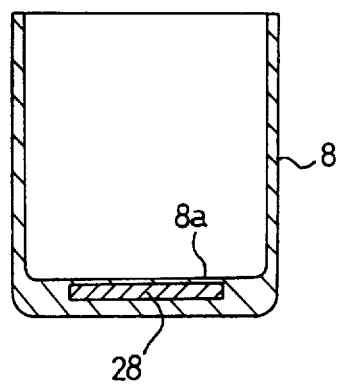

As shown in FIG. 10, the water cup 8 preferably has a permanent magnet 28 molded in its bottom portion 8a.

Preferably, the water cup 8 is also equipped with a rotating force exerting unit adapted to apply a rotating force to a water supplied from the assistant water container 7 to the water cup 8. By the provision of the rotating force exerting unit, it is possible to maintain the magnetically treated water more effectively.

Figure 11:
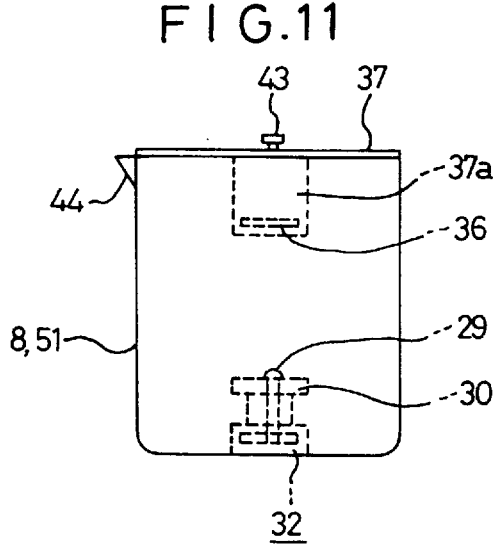
Figure 12:
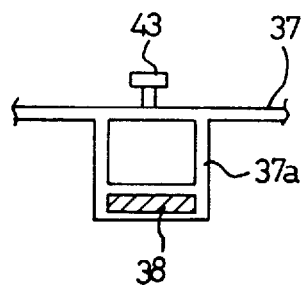
Figure 13:
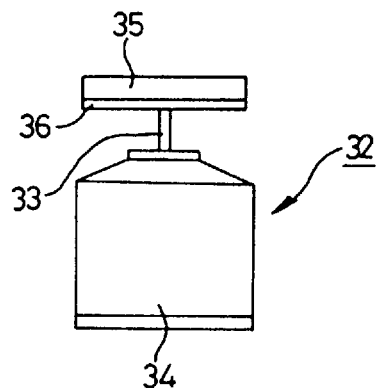

FIGS. 11 to 13 illustrate a preferred construction of the rotating force exerting unit, respectively. As shown in FIGS. 11 to 13, the rotating force exerting unit includes a central shaft 29 fixedly mounted to the bottom portion of the water cup 8, a rotating blade 30 mounted on the central shaft 29 such that it can rotate about the central shaft 29, a permanent magnet 31 molded in the rotating blade 30, and a driving unit 32 fixedly disposed on the bottom portion of the water cup 8 and adapted to apply a rotating force to the rotating blade 30.

The driving unit 32 includes a drive motor 34 having a rotating shaft 33 and a driving permanent magnet 35 fixedly mounted on the rotating shaft 33.

The rotating shaft 33 is provided with a shield plate 36 comprised of, for example, an aluminum plate and adapted to shield the magnetic force of the permanent magnet 34.

A lid 37 is separably coupled to the upper end of the water cup 8. The lid 37 serves to prevent a foreign matter such as dust from entering the water cup 8 during its carrying. Although not shown, the lid 37 is provided with a through-hole for receiving a magnetically treated water discharged out of the discharge tube 26 at a state that the lid 37 coupled to the water cup 8 is received in position in the interior of the refrigerator.

As best shown in FIG. 12, the lid 37 has at its lower surface a magnet supporting portion 37a in which a permanent magnet 38 is molded. By the permanent magnet 38, the magnetically treated water fed to the water cup 8 keeps its magnetically treatment more effectively.

The water cup 8 is also provided at its upper end with an outlet 44 for discharging the magnetically treated water out of the water cup 8.

In FIG. 2, the reference numerals 41 and 42 denote knobs, respectively, and the reference numeral 43 denotes a handle of the water cup 8.

Operation of the device for magnetically treating water equipped in the refrigerator in accordance with the present invention will now be described.

The main water containers 5 and 6 are first separated from the support member 4 installed at the door 2 of the refrigerating chamber 1. The lids 9 and 10 are then separated from the main water containers 5 and 6, respectively. A general water is then sufficiently supplied to both the opened main water containers 5 and 6.

At this time, the cock valves 15 and 16 of main water containers 5 and 6 are maintained to be resiliently urged in a downward direction by the springs 17 and 18, respectively, so that the outlet ports 5b and 6b of main water containers 5 and 6 are closed as shown in FIG. 4A, thereby preventing the water contained in the main water containers 5 and 6 from being discharged through the outlet ports 5b and 6b.

The main water containers 5 and 6 are then laid in position on the assistant water container 7, as shown in FIG. 4B. Once the main water containers 5 and 6 are laid on the assistant water container 7, the valve stems of the cock valves 15 and 16 of main water containers 5 and 6 come into contact with the corresponding push rods 19 of assistant water container 7, respectively. As a result, the cock valves 15 and 16 are raised against the resilience of the springs 17 and 18, thereby causing the outlet ports 5b and 6b of main water containers 5 and 6 to be opened. Accordingly, the water contained in the main water containers 5 and 6 is fed to the assistant water container 7 through the outlet ports 5b and 6b of main water containers 5 and 6 and then the inlet ports 7a and 7b of assistant water container 7.

Since several permanent magnets 12, 13 and 14 are arranged around the main water containers 5 and 6, the water contained in the main water containers 5 and 6 are primarily magnetized. By this magnetization, the water is changed in molecular structure to take the form of hexagonal water.

As an electric power is applied to the drive motor 23, the driving permanent magnet 24 fixedly mounted to the rotating shaft 22 is rotated. By a magnetic force of the driving permanent magnet 24 being rotated, the rotating magnet 21 disposed at the bottom portion of main water container 5 rotates about the central shaft 20.

As the rotating magnet 21 rotates, the water in the main water container 5 is stirred. During the stirring, the water is continuously subjected to a force F generated by the permanent magnets arranged around the main water containers 5 and 6, so that it is effectively changed into hexagonal water. The force F is expressed by $F = BQ \cdot V \sin \theta$, where B represents a magnetic flux density, V a velocity, Q a charge amount, and $\theta$ an angle.

Since the shield plate 25, made of a material such as aluminum, is disposed beneath the driving permanent magnet 24, the magnetic force of driving permanent magnet 24 is prevented from affecting elements arranged beneath the magnet 24.

The produced hexagonal water can be fed from the assistant water container 7 to the water cup 8 via the discharge valve 27 disposed in the discharge tube 26 so that a user can drink the magnetically treated water.

Where the water cup 8 is equipped with the rotating force exerting unit and magnetizing unit as shown in FIG. 11, the rotating blade 30 molded with the permanent magnet 31 is rotated by the driving force of the driving unit 32. By virtue of the rotation of rotating blade 30, the magnetically treated water contained in the water cup 8 rotates in a direction perpendicular to a magnetic field generated by the permanent magnet 38. As a result, the effect of the magnetic field on the hexagonal water is maximized, thereby enabling the magnetically treated water to keep its magnetically treated more effectively.

Figure 9:
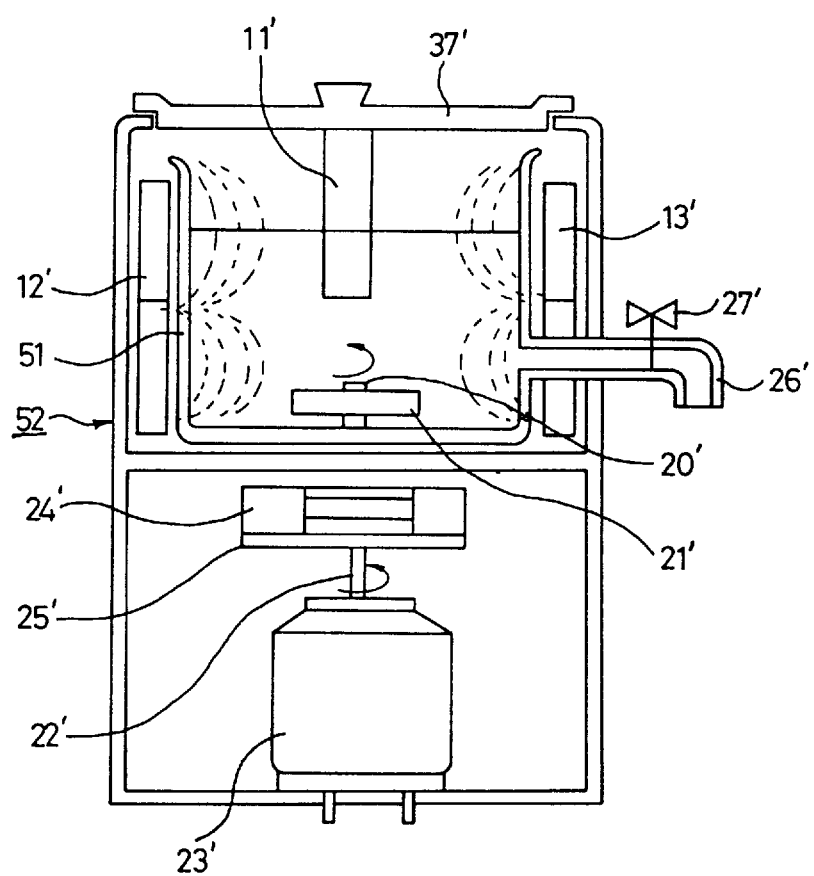
FIG. 9 is a sectional view illustrating a device for magnetically treating water in accordance with another embodiment of the present invention.

FIG. 9 is a sectional view illustrating a device for magnetically treating water in accordance with another embodiment of the present invention. The device for magnetically treating water of this embodiment is characterized in that the hexagonal water is directly discharged out of the main water containers without using any assistant water container.

As shown in FIG. 9, this device for magnetically treating water includes a water container 51 held in a housing 52 disposed in the interior of the refrigerating chamber, a plurality of permanent magnets 11', 12' and 13' arranged around the water container 51 and adapted to apply a magnetic force to a water contained in the water container 51, a rotating force exerting unit including elements 20' to 25' adapted to rotate the water and thereby promote the change of the water into the form of hexagonal water, and a discharge unit including elements 26' and 27' provided at the water container 51 and adapted to discharge the water out of the water container 51.

The water container 51 has the same basic construction as the water cup 8 shown in FIG. 11, except for its discharge unit.

The permanent magnets, rotating force exerting unit and discharge unit have the same constructions as those of the afore-mentioned embodiment and, thus, their detailed description will be omitted.

Figure 14:
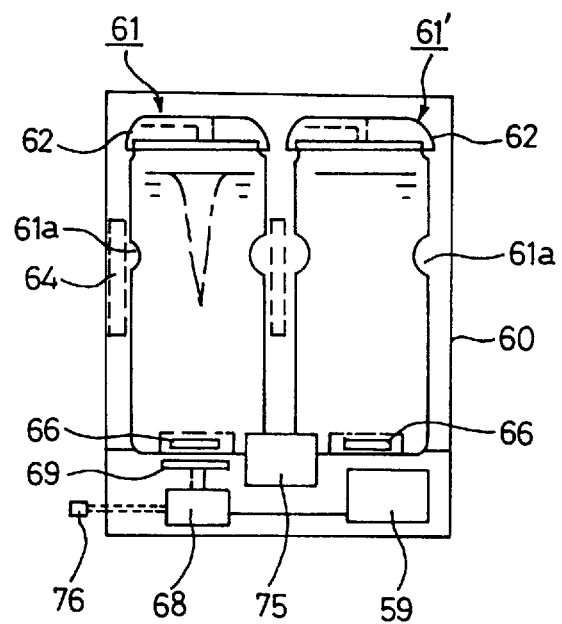
FIG. 14 is a sectional view illustrating a device for magnetically treating water in accordance with another embodiment of the present invention.

FIG. 14 is a sectional view illustrating a device for magnetically treating water in accordance with another embodiment of the present invention. The device for magnetically treating water of this embodiment is characterized by an optimization of the production of magnetically treated water achieved by self-sensing the quantity of a water contained in a water container and rotating the water for an appropriate time determined on the basis of the sensed water quantity.

As shown in FIG. 14, this device for magnetically treating water includes a water container 61 for containing a water therein, a magnetizing unit arranged around the water container 61 and adapted to apply a magnetic force to the water contained in the water container 61, a rotating force exerting unit adapted to exert a rotating force on the water contained in the water container 61 and thereby promote the change of the water into the form of magnetically treated water, and a control unit 59 adapted to sense the quantity of the water contained in the water container 61 and apply an appropriate rotating force based on the sensed water quantity to the water.

Figure 15:
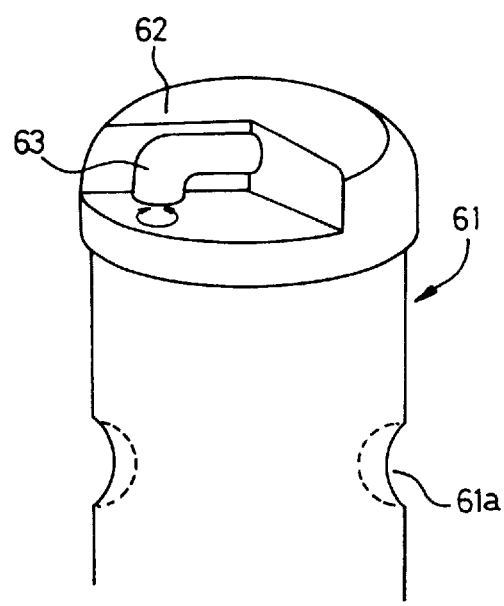
FIG. 15 is a perspective view illustrating the appearance of a water container shown in FIG. 14.

The construction of the device for magnetically treating water will now be described in detail. As shown in FIGS. 15 and 16, a lid 62 is threadedly coupled to the upper end of the water container 61 such that it can be separated from the water container 61. To the lid 62, a magnetically treated water discharge tube 63 is connected such that it can turn horizontally.

Outlet ports 62a and 63a are provided at appropriate positions in the lid 62 and hexagonal water discharge tube 63, respectively. When the discharge tube 63 is turned to its outer position where its tip directs outward so as to discharge the magnetically water, the outlet ports 62a and 63a are aligned with each other to enable the discharge of the hexagonal water. On the contrary, when the discharge tube 63 is turned to its inner position where its tip directs inward, the outlet ports 62a and 63a are misaligned, thereby disabling the discharge of the hexagonal water.

The water container 61 is provided at its body with grip grooves 61a for enabling the water container 61 to be easily gripped by one hand of the user.

By referring to FIG. 14, the magnetizing unit comprises permanent magnets 64 arranged around the water container 61 to surround the water container 61 together. The positions, number and shape of the permanent magnets 61 are not limited specifically, but may be optional in so far as the permanent magnets 61 can change more effectively the water contained in the water container 61 into the form of hexagonal water.

By referring to FIG. 17, the rotating force exerting unit includes a central shaft 65 fixedly mounted to the bottom portion of the water container 61, a rotating magnet 66 mounted on the central shaft 65 such that it can rotate about the central shaft 65, a drive motor 68 having a rotating shaft 67 disposed beneath the water container 61, and a disc-shaped driving permanent magnet 69 fixedly mounted on the rotating shaft 67 and adapted to generate a magnetic force for rotating the rotating magnet 66.

The rotating magnet 66 may be a magnet of various types such as a monopole type, bipole type, etc., as shown in FIGS. 7A and 7B. In similar, the driving permanent magnet 69 may be a magnet of various types such as monopole type, bipole type and multipole type, as shown in FIGS. 8A and 8B.

A shield plate 25 made of a non-magnetic material such as aluminum is provided at the rotating shaft 67 in order to shield the driving permanent magnet 69.

Although only one water container has been described, it is preferred to use two water containers as in the illustrated case. In this case, one of the water containers, namely, the water container 61 is adapted to produce the magnetically treated water while the other water container 61' is adapted to store the produced hexagonal water so as to subsequently drink the stored magnetically treated water. When the water container 61' empties its magnetically treated water completely, it changes its position with the water container 61 filled with a magnetically treated water newly produced. By such a position change of the water containers, the user can always drink the magnetically treated water.

By referring to FIG. 17, the control unit 59 of FIG. 14 includes a microcomputer adapted to control the drive motor 68 and a weight sensor adapted to sense the weight of the water container 61. The weight sensor is disposed at an appropriate position on the top portion of a base 70 on which the water container 61 is laid.

As shown in FIG. 18, the weight sensor includes a housing 71 fixedly mounted to the lower surface of the top portion of base 70, a moving member 72 coupled to the housing 71 such that it moves vertically in the housing 71 and protruded upwards through the top portion of base 70, a compression spring 73 disposed in the housing 71 and having a predetermined elastic coefficient for urging the moving member 72 upwards, and a sensing switch 74 fixedly mounted to the bottom portion of the housing 71 and switched on and off by the moving member 72 being vertically moved.

The elastic coefficient of the compression spring 73 is appropriately determined so that the sensing switch 74 is switched on at a state that a predetermined amount of water is contained in the water container 61.

For example, where the elastic coefficient of the compression spring 73 is higher than the weight of the empty water container 61, the sensing switch 74 is maintained at its OFF state when the empty water container 61 is laid on the top portion of base 70. This is because the compression spring 72 is not compressed by only the weight of the empty water container 61. When the water container 61 filled with a certain quantity of water is laid on the top portion of base 70, that is, when the weight of the water container 61 becomes higher than the elastic coefficient of the compression spring 72, the compression spring 72 is compressed, thereby causing the sensing switch 74 to be at its ON state. Thus, the sensing switch 74 can be switched on by a predetermined amount of water by appropriately adjusting the elastic coefficient of the compression spring 72.

It is also possible to automatically determine the point of time when the production of magnetically treated water is completed. This is achieved by constructing the sensing switch 74 to have multiple ON stages depending on the quantity of water contained in the water container 61 and thereby quantitatively sense the quantity of water, and programming an operation of the drive motor 68 in a manner that the drive motor 68 operates for a time required for the sensed quantity of water.

This operation will be more effectively carried out by additionally providing an operation display unit 75 (FIG. 14) and thereby enabling a user to visually check the current operation state.

In FIG. 14, the reference numeral 76 denotes a power supply terminal.

The above-mentioned construction may be enclosed in a case 60 so that it is separably installed in the interior of refrigerator or may be used as an independent hexagonal water producing device.

Figure 19:
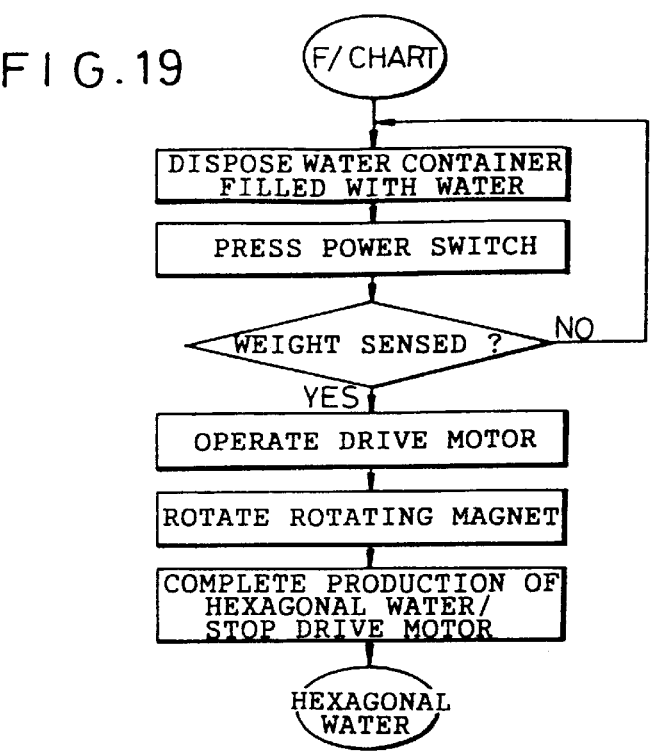
FIG. 19 is a flow chart illustrating an operation of the device for magnetically treating water shown in FIGS. 14 to 18.

FIG. 19 is a flow chart illustrating an operation of the device for magnetically treating water just mentioned above.

As shown in FIG. 19, the user first disposes the water container 61 filled with a certain quantity of water on the base 70 in the case 60 and then switches on a power switch of the operation display unit 75.

Where the quantity of water contained in the water container 61 is smaller than a reference water quantity, the sensing switch 74 is maintained at its OFF state because the water container 61 cannot move the moving member 72 downwards. As a result, the drive motor 68 is maintained at its OFF state. This state is then displayed on the operation display unit 75.

Where a sufficient quantity of water not smaller than the reference water quantity is contained in the water container 61, it is primarily magnetized by the permanent magnets 64 arranged around the water container 61 and thereby changed into a hexagonal water. In this case, the moving member 72 moves downwards by the weight of the water container 61, thereby causing the sensing switch 74 to be switched on. As a result, the drive motor 68 is driven.

As the drive motor 68 rotates, the driving permanent magnet 69 is rotated while generating a magnetic force. The rotating magnetic force of the driving permanent magnet 69 results in a rotation of the rotating magnet 66 disposed at the bottom portion of water container 61.

By the rotation of rotating magnet 66, the water in the water container 61 rotates at a certain velocity so that it is continuously subjected to a force of $F=BQV \cdot \sin \theta$, where B represents a magnetic flux density, V a velocity, Q a charge amount, and $\theta$ an angle. Accordingly, the water is more efficiently changed into the hexagonal water.

Since the shield plate such as aluminum plate is disposed beneath the driving permanent magnet 69, the magnetic force of driving permanent magnet 69 is prevented from affecting elements arranged beneath the magnet 69.

As mentioned above, the point of time when the production of magnetically treated water is completed is automatically determined by constructing the sensing switch 74 to have multiple ON stages depending on the quantity of water contained in the water container 61 and thereby driving the drive motor 68 for a time required for the sensed quantity of water. Accordingly, the drive motor 68 is automatically stopped upon completing the production of magnetically treated water. The completion of the production of hexagonal water is then displayed on the operation display unit 75 to inform the user of the fact that he can drink the water contained in the water container 61.

Figure 20:
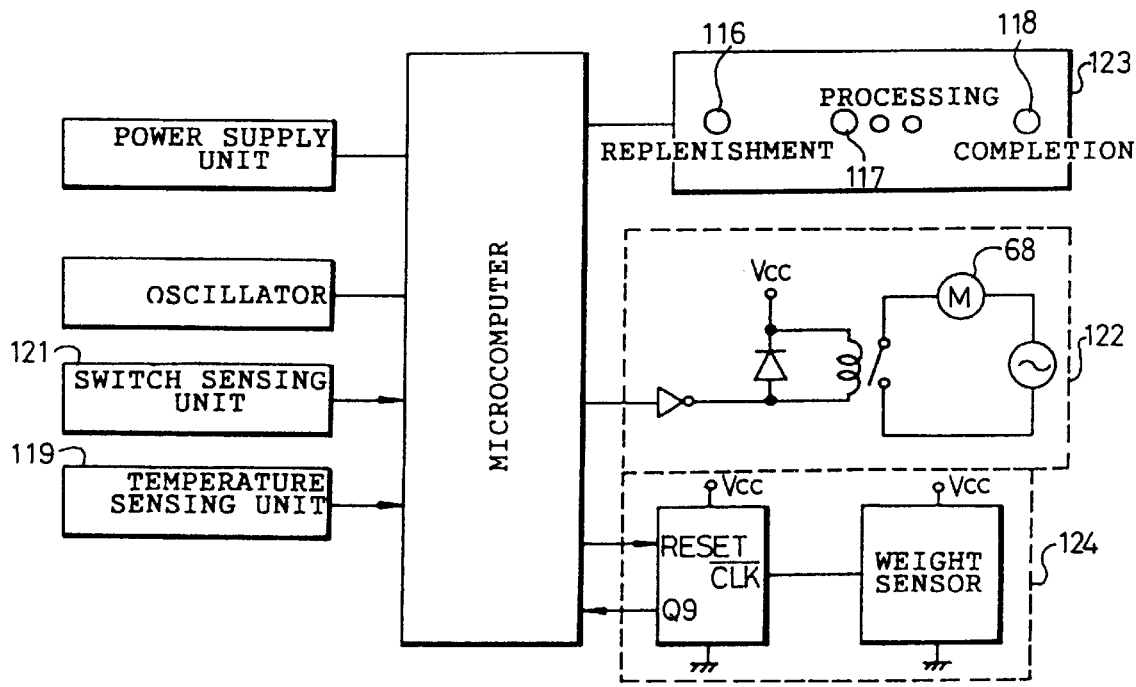
FIG. 20 is a block diagram illustrating a control circuit which can be applied to all embodiments of the present invention.

FIG. 20 is a block diagram illustrating a control circuit which can be applied to each of the above-mentioned embodiments of the present invention.

As shown in FIG. 20, the control circuit includes a weight sensing unit 124 for counting the number of pulses of a frequency signal outputted from a capacitance-type weight sensor S used in place of a weight sensing switch of the type shown in FIG. 18 and adapted to output pulses of a frequency signal proportional (or inversely proportional) to the weight of a water contained in the water container, a temperature sensing unit 119 for sensing an ambient temperature of the hexagonal water producing device disposed in the refrigerating chamber, a switch sensing unit 121 for sensing ON/OFF states of a key selected by the user, a motor driving unit 122 for driving the drive motor 68, and a display unit 123 for displaying operation states until the production of hexagonal water is completed and the completion of the production of hexagonal water and thereby informing the user of them. The control circuit further includes a microcomputer 115 for controlling all the above-mentioned units and thereby managing all operations for producing the hexagonal water, a power supply unit for supplying an electric power to the microcomputer 115 and all the units, and an oscillator for providing system clocks to the microcomputer 115.

Figure 21:
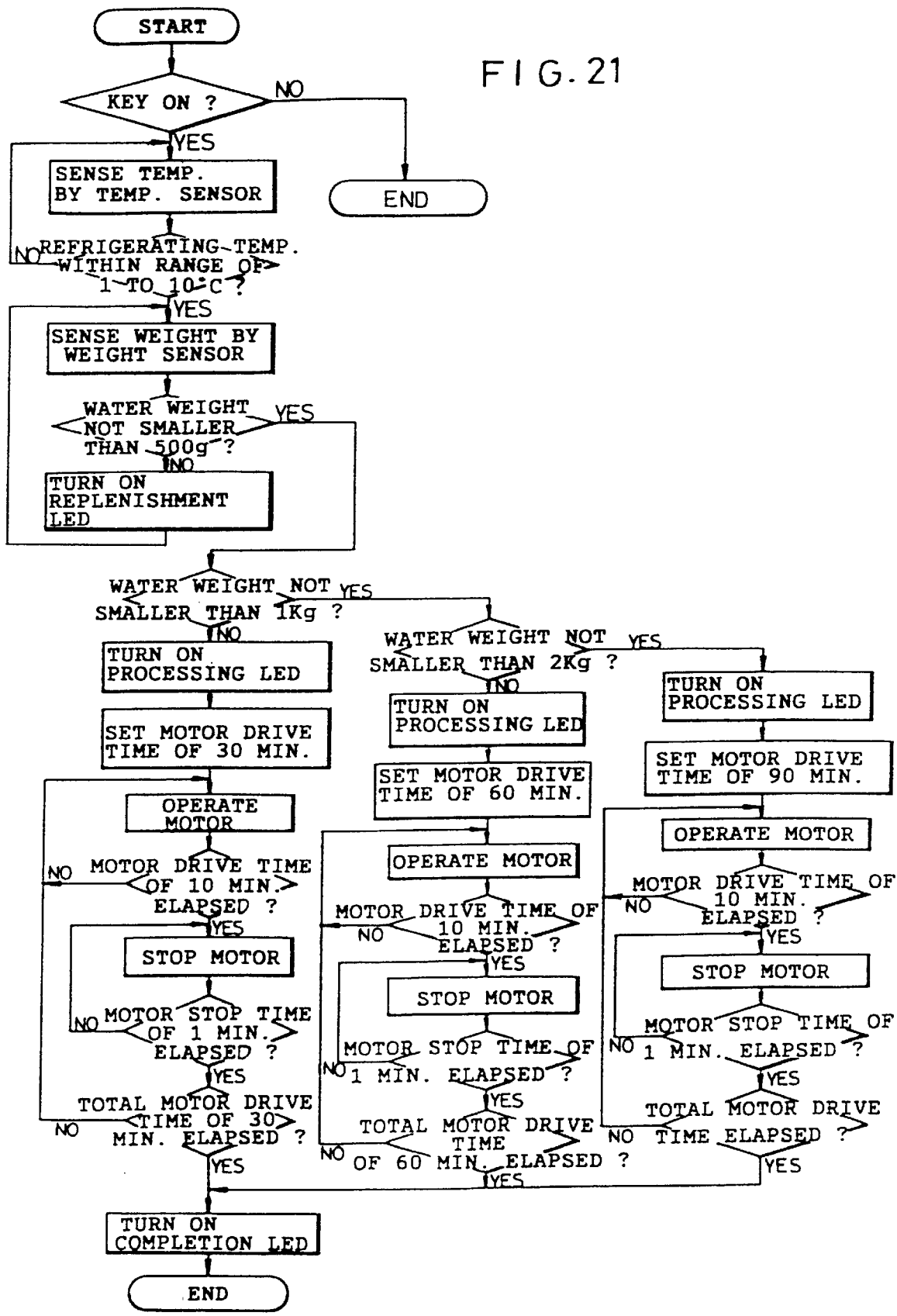
FIG. 21 is a flow chart illustrating an operation of the control circuit shown in FIG. 20.
Figure 21A:
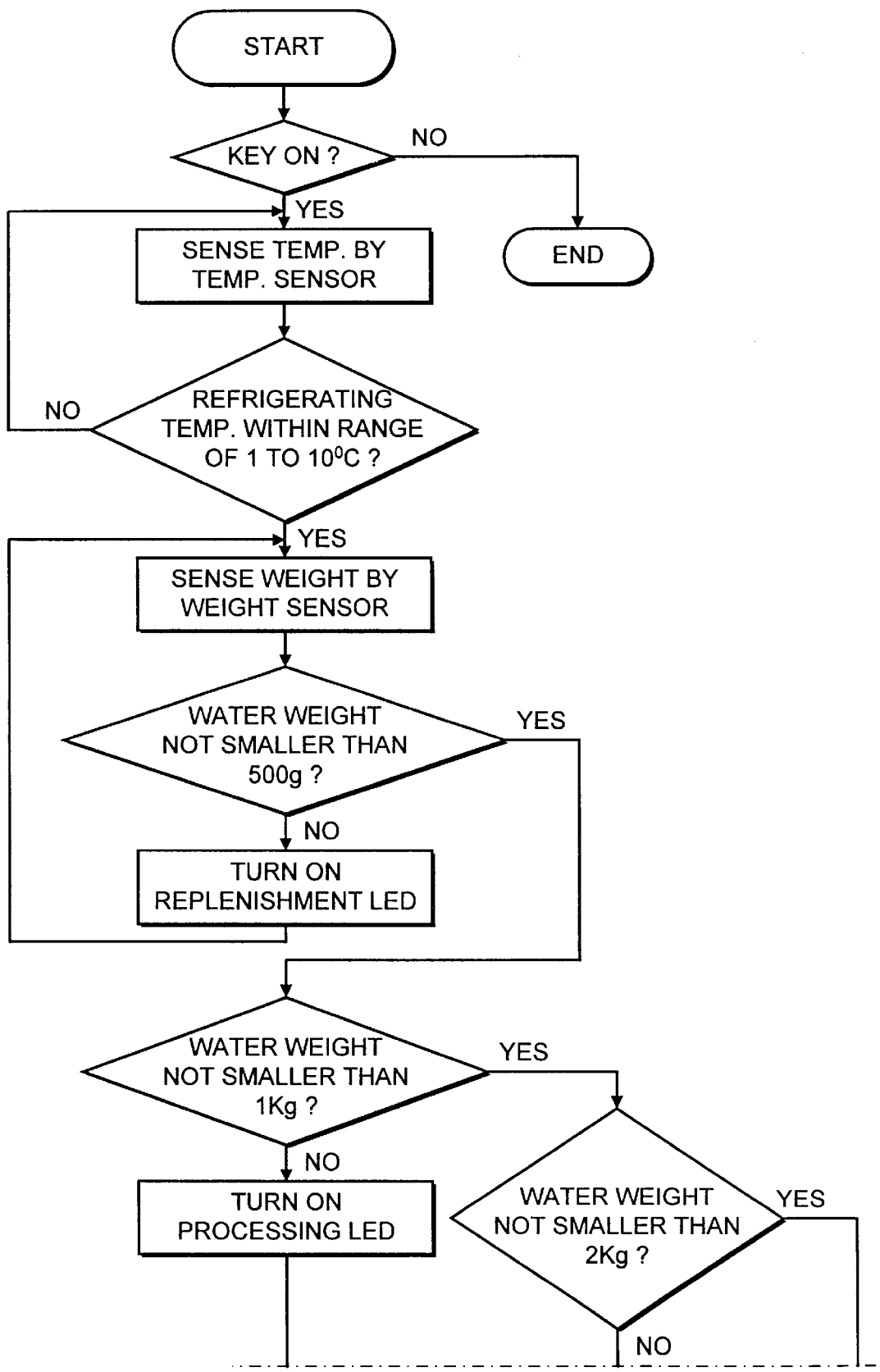
Figure 21B:
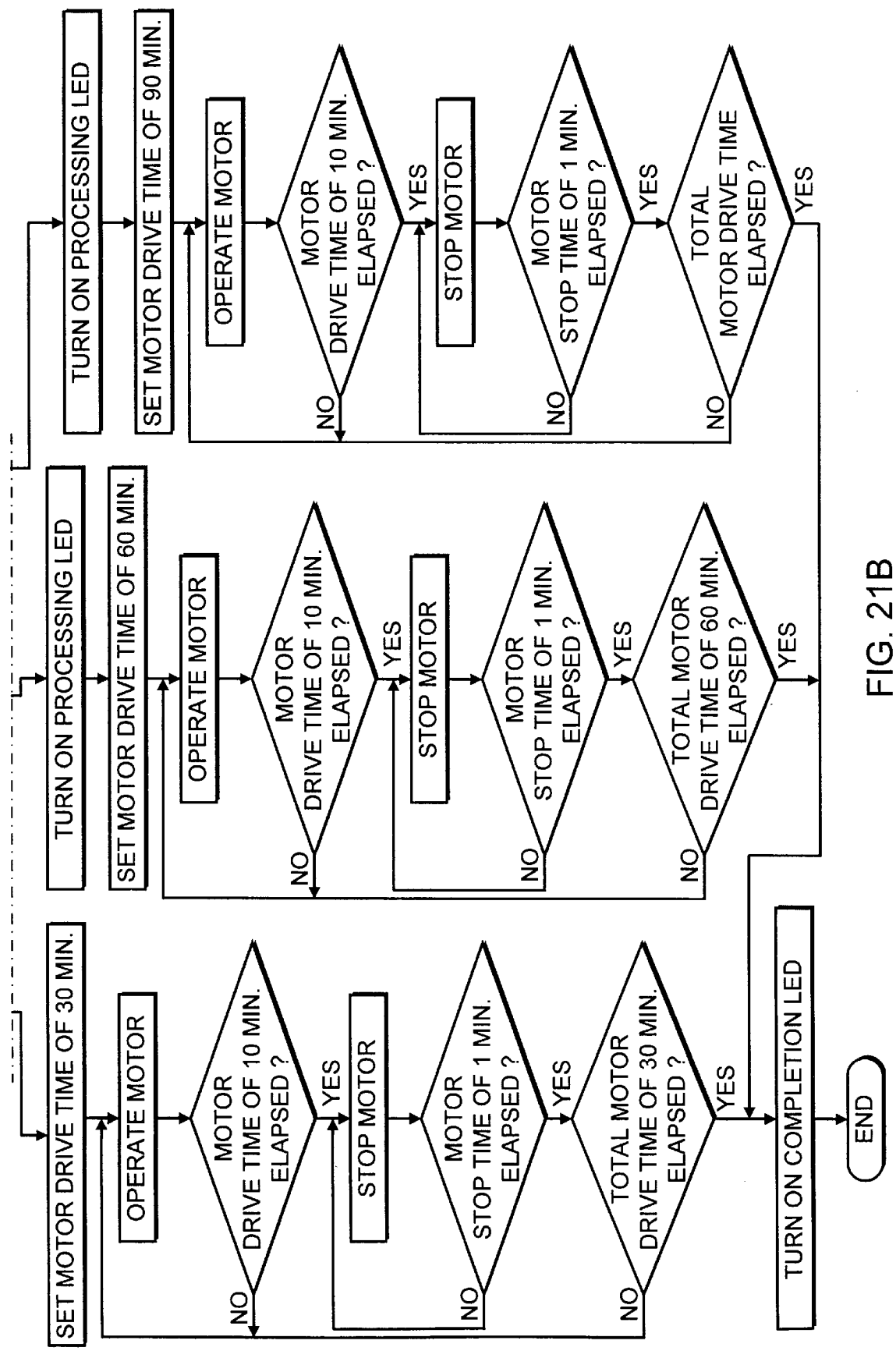

Operation of the control circuit is illustrated in FIG. 21.

When the user presses a start key under a condition that the water container 61 filled with water has been disposed in position, the switch sensing unit 121 senses the current state of the key and transmits the sensed key state to the microcomputer 115. In response to the output signal from the switch sensing unit 121, the microcomputer 115 receives an internal temperature of the refrigerating chamber sensed by a temperature sensor disposed in the refrigerating chamber from the temperature sensing unit 119. When the temperature is within a range from 1° C. to 10° C., the microprocessor 115 controls the weight sensing unit 124 to measure the weight of the water container 61.

That is, the capacitance-type weight sensor S of the weight sensing unit 124 senses the weight of the water container 61 transmitted via a weight support member (not shown) under a condition that the water container 61 has been filled with the water. Based on the sensed weight, the capacitance-type weight sensor S outputs a frequency signal to a counter integrated circuit (IC) 120 constituting a part of the weight sensing unit 124. The counter IC 120 receives the frequency signal at its clock terminal CLK and then sends an output based on the received frequency signal to the microcomputer 115. On the basis of the output from the weight sensing unit 124, the microcomputer 115 recognizes the weight of the water and thereby performs an appropriate control operation. Where the weight of water is smaller than a reference weight, for example, 500 g, the microcomputer 115 controls the display unit 123 to turn on a water replenishment light emitting diode (LED) 116. On the other hand, in the case that the weight of water is appropriate to perform the operation for producing a magnetically treated water, that is, where the weight of water is not smaller than the reference weight, for example, 500 g, the microcomputer 115 turns on a processing LED 117. In the former case, the user replenishes a water on the basis of the turning-on of the water replenishment LED 116.

When the weight of water after the replenishment of water is determined to be smaller than a first predetermined weight, for example, 1 Kg, the microcomputer 115 controls the display unit 123 to turn on the processing LED 117 and outputs a control signal to the motor driving unit 122 to drive the drive motor 68. In this case, the drive time of the drive motor 68 may be controlled in accordance with predetermined values. For example, the drive motor 68 is driven for a total time of 30 minutes in a manner that it is continuously driven for every 10 minutes while being stopped for one minute after every 10-minute driving. In this case, the drive motor 68 will be completely stopped after the total time of 30 minutes elapses. A completion LED 118 of the display unit 123 is then turned on. Under this condition, the user can drink the water contained in the water container 61.

As the drive motor 68 rotates under the control of the microcomputer 115, the driving permanent magnet 69 coupled thereto is rotated. Accordingly, the rotating magnet 66 disposed in the water container 61 is rotated by the magnetic force of the driving permanent magnet 69 being rotated, thereby causing the water in the water container 61 to rotate. As a result, the change of the water into a magnetically treated water is promoted.

Where the weight of water after the replenishment of water is determined to be not smaller than the first predetermined weight, but smaller than a second predetermined weight, for example, 2 Kg, the microcomputer 115 recognizes the weight of water and then controls the display unit 123 to turn on the processing LED 117. The microcomputer 115 also controls the drive motor 68 of the motor driving unit 122. In this case, the total drive time of the drive motor 68 is set to be 60 minutes so that the drive motor 68 is continuously driven for every 10 minutes while being stopped for one minute after every 10-minute driving. After the total drive time of 60 minutes elapses, the production of magnetically treated water is completed. At this time, the microcomputer 115 controls the display unit 123 to turn on the completion LED 118.

On the other hand, where the weight of water after the replenishment of water is determined to be not smaller than the second predetermined weight, that is, 2 Kg, the total drive time of the drive motor 68 is set to be 90 minutes so that the drive motor 68 is continuously driven for every 10 minutes while being stopped for one minute after every 10-minute driving. After the total drive time of 90 minutes elapses, the microcomputer 115 stops the drive motor 68 and turns on the completion LED 118.

The above procedure is adapted to determine an appropriate drive time based on the quantity of water in order to minimize the energy consumed for the production of hexagonal water and thereby achieve an efficiency of the production of magnetically treated water.

Figure 22:
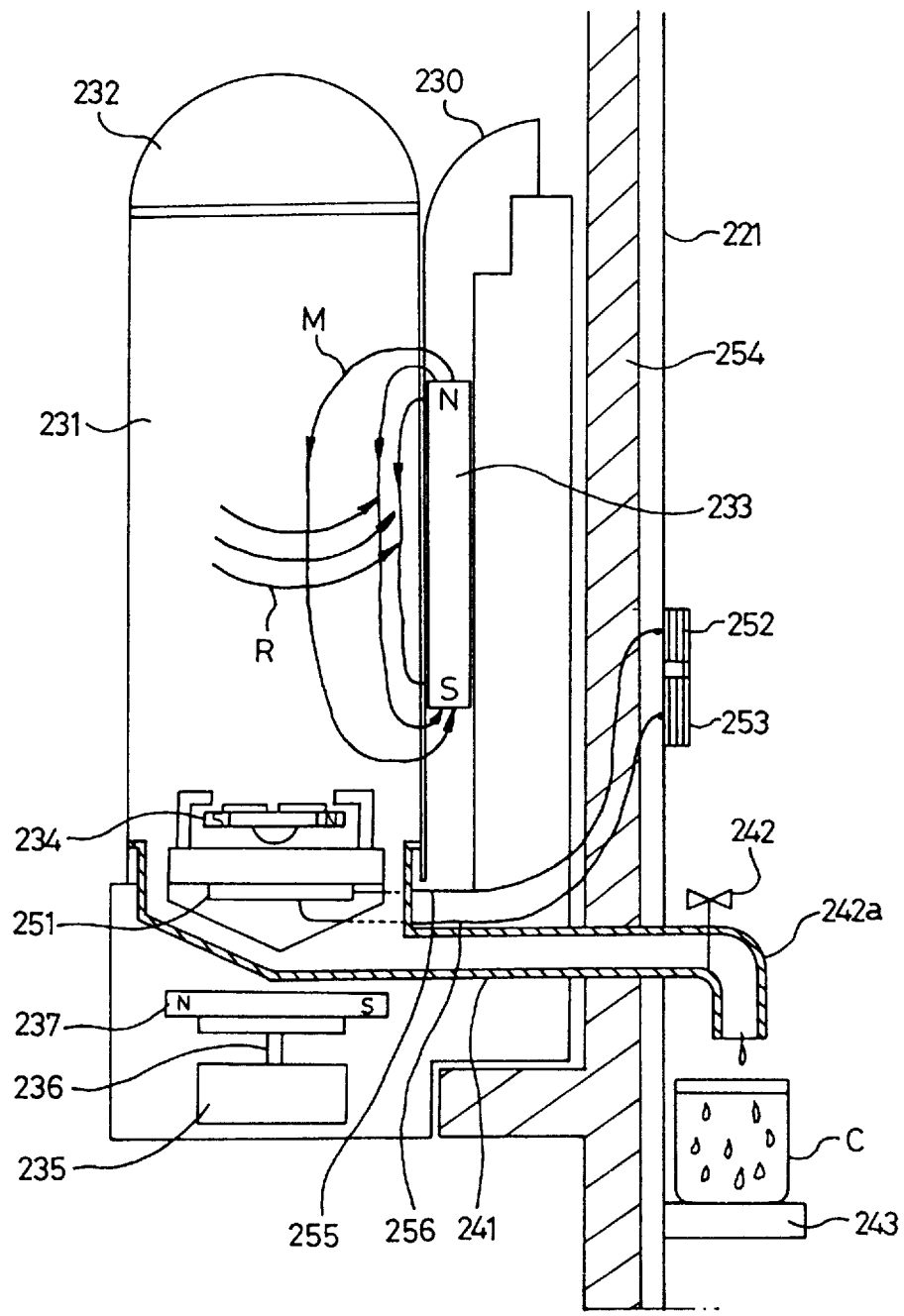
FIG. 22 is a view illustrating a construction in accordance with another embodiment of the present invention adapted to guide the outlet port of the device for magnetically treating water toward the outside of the refrigerator.

FIG. 22 illustrates another construction which can be applied to each of the above-mentioned embodiments of the present invention.

The construction shown in FIG. 22 is capable of taking the magnetically treated water produced by the hexagonal water producing device at the outside of the refrigerator without opening the door of refrigerator. Since detailed construction of this hexagonal water producing device is the same as those of the above-mentioned embodiments, it is omitted and only the difference will be described.

Referring to FIG. 22, the device for magnetically treating water in accordance with this embodiment includes a case 230 fixedly mounted to an appropriate portion of the inner surface of a refrigerating chamber door 221, a water container 231 separably mounted to the case 230, a lid 232 coupled to the upper end of the water container 231, permanent magnets 233 arranged around the water container 231 and adapted to apply a magnetic force to water contained in the water container 231, a rotating magnet 234 rotatably disposed at the bottom portion of the water container 231, a drive motor 235 fixedly mounted to the bottom portion of the case 230 such that it is spaced a certain distance apart from the water container 231, and a driving magnet 237 fixedly mounted on a rotating shaft 236 of the drive motor 235 and adapted to rotate the rotating magnet 234 by its magnetic force.

The device for magnetically treating water also includes a magnetically water discharging unit comprising an extension pipe 241 connected to the bottom portion of water container 231 and adapted to guide a magnetically water contained in the water container 231 outward of the water container 231, a discharge tap 242a connected to an end of the extension pipe 241 and adapted to discharge the magnetically water and a valve 242 disposed in the discharge tap 242a.

A cup support die 243 is fixedly mounted to an appropriate portion of the outer surface of the refrigerating chamber door 221 beneath the discharge tap 242a so that the magnetically treated water can be put in a water cup C laid on the cup support die 243.

In accordance with this embodiment, the device for magnetically treating water is characterized by the provision of a water replenishment informing unit for sensing existence and nonexistence of water in the water container 231 and informing the user of the point of time when the water container 231 is to be replenished with a water.

The water replenishment informing unit includes a weight sensor 251 attached to the lower surface of the water container 231 and adapted to sense the weight of a water contained in the water container 231 and thereby detect the existence and nonexistence of water in the water container 231, and a water-existence lamp 252 and a water-nonexistence lamp 253 both attached to the outer surface of the refrigerating chamber door 221 and adapted to transmit associated signals from the weight sensor 251 to the user, respectively.

In FIG. 22, the reference numeral 254 denotes an insulating member while the reference numerals 255 and 256 denote electric wires.

Operation of the device for magnetically treating water in accordance with this embodiment will now be described.

Once a general water is supplied to the water container 231, the weight sensor 251 disposed beneath the water container 231 senses the weight of the water. On the basis of the sensing operation of the weight sensor 251, the water-existence lamp 252 is turned on.

At this time, an application of an electric power to the drive motor 235 results in a rotation of the rotating shaft 236 of drive motor 235 and thereby a rotation of the driving magnet 237. As the driving magnet 237 rotates, the rotating magnet 234 disposed at the lower portion of water container 231 is rotated by a magnetic force of the driving magnet 237, thereby causing the water in the water container 231 to rotate in a direction indicated by an arrow R of FIG. 22. The magnetic lines of force M of the permanent magnets 233 pass through the rotating water in a direction orthogonal to the rotation direction of the water. As a result, the water contained in the water container 231 is changed into a magnetically treated water.

For drinking the produced magnetically treated water, the valve 242 is opened at a closed state of the refrigerating chamber door 231. At the opened state of the valve 242, the hexagonal water is outward discharged through the tap 242a.

When the water container 231 empties its hexagonal water completely, the weight sensor 251 senses this state and then turns off the water-existence lamp 252. At the same time, the water-nonexistence lamp 253 is turned on to inform the user of the fact that the water container 231 has emptied its magnetically treated water completely.

The device for magnetically treating water in accordance with this embodiment has advantages of an easy taking of magnetically treated water by the construction capable of taking the magnetically treated water at the outside of the refrigerator without opening the door of refrigerator, and a reduction in power consumption and a lengthened storage of refrigerated foods by the construction capable of reducing the number of door opening and closing times and thereby reducing a loss of cold air. In particular, a waste of electric power can be prevented because the internal condition of the refrigerator can be checked without opening the door of refrigerator by sensing the existence and nonexistence of water in the water container and informing the user of the sensed result.

As apparent from the above description, the present invention provides a device for magnetically treating water for changing general water into the form of magnetically treated water, which device can be applied to a refrigerator so that everyone can drink easily the magnetically treated water.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A device for magnetically treating water for a refrigerator comprising:

a water container disposed in the interior of the refrigerator;

magnetizing means arranged around the water container and adapted to apply a magnetic force to a water contained in the water container and thereby change the water into the form of magnetically treated water, said magnetizing means comprising at least one permanent magnet arranged around an outer surface of the water container and a rotating magnet rotatable mounted to an inner bottom surface of the water container; and rotating means adapted to rotate the water in the water container and thereby promote the change of the water into the magnetically treated water.

2. A device for magnetically treating water in accordance with claim 1, wherein the water container is provided with magnetically treated water discharging means for discharging the magnetically treated water out of the water container.

3. A device for magnetically treating water in accordance with claim 1, wherein the magnetically treated water discharging means comprises a water outlet port formed at a top portion of the water container.

4. A device for magnetically treating water in accordance with claim 1, wherein the rotating means comprises a drive motor disposed beneath an outer bottom surface of the water container, the drive motor having a rotating shaft provided with a driving permanent magnet and being adapted to rotate the magnetizing means by a magnetic force of the driving permanent magnet.

5. A device for magnetically treating water in accordance with claim 4, wherein the rotating shaft of the drive motor is provided with shield means for shielding the magnetic force of the driving permanent magnet.

6. A device for magnetically treating water for a refrigerator, comprising:

at least one main water container disposed in the interior of the refrigerator;

magnetizing means arranged around the main water container and in the interior of the main water container, the magnetizing means being adapted to apply a magnetic force to a water contained in the main water container and thereby change the water into the form of a magnetically treated water;

rotating means adapted to rotate the water in the main water container and thereby promote the change of the water into the magnetically treated water;

an assistant water container adapted to receive the magnetically treated water from the main water container and store it therein;

valve means disposed between the main and assistant water containers and adapted to transfer the magnetically treated water from the main water container to the assistant water container; and discharge means provided at the assistant water container and adapted to discharge the stored magnetically treated water out of the assistant water container.

7. A device for magnetically treating water in accordance with claim 6, wherein the magnetizing means comprises at least one permanent magnet arranged around an outer surface of the main inner bottom surface of the water container, and a rotating magnet rotatably mounted to an inner bottom surface of the water container, and the rotating means comprises a drive motor disposed beneath an outer bottom surface of the main water container, the drive motor having a rotating shaft provided with a driving permanent magnet and being adapted to rotate the rotating magnet of the magnetizing means by a magnetic force of the driving permanent magnet.

8. A device for magnetically treating water in accordance with claim 7, wherein the magnetizing means further comprises a permanent magnet provided at an inner top surface of the main water container.

9. A device for magnetically treating water in accordance with claim 7, wherein the rotating shaft of the drive motor is provided with shield means for shielding the magnetic force of the driving permanent magnet.

10. A device for magnetically treating water for a refrigerator, comprising:

at least one main water container adapted to store a water therein;

magnetizing means arranged around the water container and adapted to apply a magnetic force to a water contained in the main water container and thereby change the water into the form of a magnetically treated water;

rotating means adapted to rotate the water in the water container and thereby promote the change of the water into the magnetically treated water; and control means adapted to sense a quantity of the water in the water container and control the rotating means on the basis of the sensed water quantity.

11. A device for magnetically treating water in accordance with claim 10, further comprising operation display means adapted to display an operation of producing the magnetically treated water under a control of the control means.

12. A device for magnetically treating water in accordance with claim 10, wherein the water container has a lid separably coupled to an upper end of the water container, a magnetically treated water discharge tube connected to the lid such that it can turn, and a handle formed at an outer side surface of the water container.

13. A device for magnetically treating water in accordance with claim 10, wherein the magnetizing means comprises at least one permanent magnet disposed to surround the water container.

14. A device for magnetically treating water in accordance with claim 10, wherein the rotating means comprises:

a central shaft disposed at an inner bottom surface of the water container;

a rotating magnet rotatably mounted on the central shaft;

a drive motor provided with a rotating shaft disposed beneath the water container; and a driving permanent magnet fixedly mounted on the rotating shaft of the drive motor and adapted to rotate the magnetizing means by a magnetic force thereof.

15. A device for magnetically treating water in accordance with claim 14, wherein the rotating shaft of the drive motor is provided with shield means for shielding the magnetic force of the driving permanent magnet.

16. A device for magnetically treating water in accordance with claim 10, wherein the control means comprises:

a microcomputer adapted to control the rotating means; and weight sensing means disposed beneath the water container and adapted to sense a weight of the water contained in the water container.

17. A device for magnetically treating water in accordance with claim 16, wherein the weight sensing means comprises:

a moving member adapted to be urged downwards by the weight of the water contained in the water container;

a spring disposed beneath the moving member and adapted to always urge the moving member upwards;

a sensing switch adapted to be switched on when the moving member moves downwards against the spring; and a housing adapted to operatively couple the moving member, the spring and the sensing switch together.

18. A device for magnetically treating water for a refrigerator, wherein said device is installed on the inside of a door of the refrigerator and there further comprises:

extension means adapted to guide the magnetically treated water produced in the device toward the outside of the refrigerator; and discharge means in fluid communication with the extension means and adapted to discharge the magnetically treated water produced by the device at the outside of the door.

19. A device for magnetically treating water in accordance with claim 18, wherein the extension means comprises an extension pipe; and the discharge means comprises a discharge tap connected to an end of the extension pipe and adapted to discharge the magnetically treated water.

20. A device for magnetically treating water in accordance with claim 19, further comprising:

a cup support die disposed beneath the discharge tap and adapted to support a water cup thereon.

21. A device for magnetically treating water in accordance with claim 18, further comprising:

water replenishment informing means adapted to sense existence and nonexistence of water in the device for magnetically treating water and informing a user of the point of time when the device for magnetically treating water is to be replenished with a water.

22. A device for magnetically treating water in accordance with claim 21, wherein the water replenishment informing means comprises:

a weight sensor adapted to sense a weight of the water contained in the device for magnetically treating water; and a water-existence lamp and a water-nonexistence lamp respectively adapted to display current water-existence and water-nonexistence states of the device for magnetically treating water on the basis of the water weight sensed by the weight sensor.

* * * * *